United States Patent [19]

Unger et al.

[11] 3,936,388

[45] Feb. 3, 1976

[54] PROCESS FOR THE PRODUCTION OF SILICON DIOXIDE ION EXCHANGERS

[75] Inventors: Klaus Unger, Darmstadt; Karlheinz Berg, Erftstadt-Lechenich, both of Germany

[73] Assignee: Merck Patent Gesellschaft mit beschrankter Haftung, Darmstadt, Germany

[22] Filed: May 25, 1973

[21] Appl. No.: 364,116

[30] Foreign Application Priority Data

May 27, 1972 Germany............................ 2225904

[52] U.S. Cl. ............ 252/182; 106/308 Q; 252/179; 252/313 S; 423/335; 427/220; 252/449
[51] Int. Cl.² .................... B01J 21/08; B01J 37/02
[58] Field of Search ........ 252/179, 317, 313 S, 182, 252/449; 117/100 S; 106/308 Q; 423/335; 427/220

[56] References Cited
UNITED STATES PATENTS

| | | | |
|---|---|---|---|
| 2,705,222 | 3/1955 | Wagner | 117/100 S |
| 2,886,460 | 5/1959 | Alexander et al. | 117/100 S |
| 2,993,809 | 7/1961 | Bueche et al. | 117/100 S |

OTHER PUBLICATIONS

Condensed Chemical Dictionary, 6th Edition, Reinhold, 1966, pp. 1017, 1162.

*Primary Examiner*—Richard D. Lovering
*Assistant Examiner*—Irwin Gluck
*Attorney, Agent, or Firm*—Millen, Raptes & White

[57] ABSTRACT

An improved process for the production of silicon dioxide ion exchangers, which comprises the step of reacting silicon dioxide with benzyltrichlorosilane, in the absence of solvent and air, followed by hydrolysis, to produce a benzylated silicon dioxide whose benzyl groups can then be substituted with ion exchange reactive groups in a conventional manner.

11 Claims, No Drawings

PROCESS FOR THE PRODUCTION OF SILICON DIOXIDE ION EXCHANGERS

BACKGROUND OF THE INVENTION

It is known that aryl groups can be chemically bound as functional groups by surface reactions to porous silicon dioxide. Conventional functional groups possessing exchange properties are then introduced onto these aryl groups. Thus, it is possible, for example, to introduce sulfonic acid groups by the sulfonation of these superficially positioned aryl groups, whereby hydrophilic silicon dioxide products are obtained having cation-exchange properties. On the other hand, anionic exchangers can be prepared in accordance with the same principle, for example by introducing chloromethyl groups into the aryl groups and coupling these with exchanging groups, e.g., amine groups.

However, according to known processes, the Si—C bond is attacked by the protons during the sulfonation reaction, and a considerable portion of the aryl groups is split off by heterolysis. Thus, the maximally attainable exchange capacity is reduced. Furthermore, ion exchange capacity additionally decreases considerably after a repeated regeneration of the exchanger with acid. These disadvantages occur also in the manufacture of corresponding anion exchangers (which has not as yet been described) so that it is impossible to obtain a high surface concentration of such ion exchanging groups.

This disadvantage can be avoided if the aryl groups are bound to the superficially located silicon atoms via $CH_2$-groups, rather than being bound directly.

In the process for the preparation of such cation exchangers known heretofore, described, for example, in East German Patent No. 8560, the benzylsilyl group is introduced by reacting silicon dioxide with benzyltrichlorosilane. The reaction takes place in chloroform with brief heating. The thus-obtained product, after separating the excess benzyltrichlorosilane with the exclusion of air and moisture, is sulfonated in the usual manner with chlorosulfonic acid. The thus-obtained acidic exchangers exhibit a maximum capacity of 0.5 meq./g. (milligram equivalents per gram).

It has now been found that it is possible to obtain silicon dioxide ion exchangers having considerably higher exchange capacity according to the process of this invention.

SUMMARY OF THE INVENTION

According to the process of this invention, silicon dioxide is reacted with benzyltrichlorosilane in the absence of a solvent and in the absence of air and moisture, and the reaction product is hydrolyzed to produce silicon dioxide bearing benzyl groups. By the novel process, a maximum concentration of exchanging groups on the surface of the silicon dioxide is achieved and both porous and nonporous silicon dioxide can be converted into intermediates for the production of cation exchangers of high capacity.

DETAILED DISCUSSION

Examples of suitable starting porous silicon dioxides are those having an average pore diameter of > 30 A.

It is advantageous before reaction to first anneal (bake) the silicon dioxide, under reduced pressure, preferably under a vacuum or even under a high vacuum, and preferably at temperatures of about 200°–500° C. After cooling, the thus-pretreated silicon dioxide is contacted with the benzyltrichlorosilane, preferably wetting with liquid benzyltrichlorosilane. The concentrations to be used are in no way critical but usually range between 0.5 to 5 parts by volume of benzyltrichlorosilane per part by weight of silicon dioxide.

The reaction is effected in the absence of both air and moisture, e.g., under a nitrogen atmosphere, preferably at a temperature above 150° C., e.g., about 200°–300° C. The reaction times vary widely, e.g., between 24 and 100 hours. Thereafter, excess benzyltrichlorosilane is removed, likewise advantageously under reduced pressure or high vacuum. Once again, it is advantageous to anneal the thus-obtained silicon dioxide product containing benzylchlorosilyl groups again under reduced pressure and under approximately the same conditions as used in case of the starting material, for example at temperatures of up to about 400° C.

The silicon dioxide containing benzylchlorosilyl groups is then suspended in water and washed until free of chloride. During this step, hydrolysis of the benzylchlorosilyl groups to benzylhydroxysilyl groups occurs. Prior to this further reaction, the modified silicon dioxide is preferably dried, for example for several hours at a temperature of about 80° to 150° C.

Functional groups having exchange properties can be introduced onto the benzylhydroxysilyl groups in accordance with conventional methods. For the production of cation exchangers, sulfonic acid groups are suitably introduced, whereas amine residues are preferably introduced for anion exchangers.

The benzylated (benzylhydroxysilylated) silicon dioxide obtained according to the process of this invention can be sulfonated according to standard methods. For example, the reaction can be conducted with chlorosulfonic acid in a suspension with an organic solvent, e.g., carbon tetrachloride or chloroform. The specific reaction conditions are adequately described in the literature. Advantageously, the suspension of the benzylated silicon dioxide in the selected organic solvent is mixed batch-wise with an emulsion of the chlorosulfonic acid in the same organic solvent, and the reaction mixture is agitated. Suitably, a heating step follows, for example by refluxing the reaction mixture. The thus-obtained product is then treated with water, the cation exchanger is filtered off, washed free of sulfate with distilled water, and dried in the usual manner.

The introduction of groups suitable for anion exchangers is carried out most advantageously by haloalkylation and subsequent amination of the products produced according to the process of this invention. The most popular method for the introduction of the chloromethyl group is by reaction with chloromethyl methyl ether in the presence of Lewis Acid catalysts, e.g., tin(IV) chloride or zinc chloride. The benzylhydroxysilated product produced according to the process of the present invention permits the production of intermediates having a very high surface concentration of chloromethyl groups. These halomethylated products are then reacted in a conventional manner with amines to the desired anion exchangers. Basically, all basic amines as well as ammonia are suitable for this purpose. The amines can be primary, secondary, or tertiary but tertiary amines are generally preferred, because strongly basic anion exchangers with quaternary groups are produced therefrom. Especially suitable and readily accessible amines for the introduction of the quaternary groups are, for example, mono-, di-, and tri-alkylamines of 1–4 carbon atoms, e.g., trimethylamine, mono-, di-, and triethylamine, as well as, for example, alkylaminoalkanols aand dialkylaminoalkanols, e.g., dimethylaminoethanol.

It has been found by analyses that, according to the process of this invention, higher than usual surface concentration of benzylsilyl groups on the silicon dioxide are achieved. Almost all hydroxyl groups of the silicon dioxide surface participate in the reaction with benzyltrichlorosilane. During the subsequent reactions, only a very minor percentage of the benzylsilyl groups is split. The remaining benzylsilyl groups can then be quantitatively sulfonated and/or chloromethylated. The maximum surface concentration of sulfonic acid groups was determined, for example, to be 4.4 $\mu$mol/m$^2$. The range usually varies from about 3 to 4.5, preferably 4.0 to 4.4 $\mu$mol/m$^2$.

The useful exchange capacity (weight capacity) of the cation exchangers produced according to the process of this invention was determined by potentiometer by means of titration with 0.1N sodium hydroxide. This capacity was maximally 1.5 meq./g. It was found that the useful exchange capacity was always somewhat higher than the exchange capacity theoretically calculated from the sulfur content. The cause for this is apparently that, in addition to the sulfonic acid groups, hydroxyl groups are also present on the surface (benzylhydroxysilyl groups) which are also detected during the titration with sodium hydroxide. Accordingly, a difunctional cation exchanger is produced employing the intermediate benzylhydroxysilylated silicon dioxides of this invention.

The thus-obtained, strongly acidic cation exchanger can be regenerated in a conventional manner. The use of 1–2N hydrochloric as the regenerating agent is the simplest procedure. Regeneration in this way takes place rapidly, completely, and gently. The loadability of the exchanger was tested by repeated loading and regeneration. After loading 5 times with 0.1N zinc sulfate solution and regeneration with 1N hydrochloric acid, the exchange capacity remains constant.

The novel cation exchangers are absolutely stable in a pH range of from 0 to 8. At pH values of above 8, the silicon dioxide is attacked with the formation of soluble silicates. With respect to concentrated, non-oxidizing acids, the exchangers are adequately stable, even up to concentrations of about 5N. The thermal behavior of these exchangers is likewise excellent. They are stable in the presence of air up to 250° C. Only when heated above 250° C., do the exchangers show a rapid decrease in the useful exchange capacity.

The useful exchange capacity (weight capacity) of the anion exchangers was determined by potentiometer by means of titration with 0.1N silver nitrate solution. The maximum exchange capacity was 0.7 meq./g. Also the anion exchangers produced according to the process of this invention can be regenerated in the usual manner. The exchange capacity remains constant after repeated regeneration.

The novel ion exchangers are also extremely pressure-resistant. The tolerable pressure stress amounts to 350 atmospheres gauge, for example, in case of spherical porous exchangers. The exchangers furthermore exhibit a very high abrasion resistance in this form. It could not be foreseen that, by this specific system of conducting the manufacturing process, such advantageous products would be obtained with an exchange capacity which is extraordinarily high for inorganic exchangers. Moreover, anion exchangers on an inorganic basis have not been described heretofore. The useful exchange capacity here corresponds approximately to the theoretical exchange capacity. In particular, when using silicon dioxides having very large pores, reaching ion-exchange equilibrium can be achieved very rapidly.

According to the process of this invention, especially advantageous ion exchangers are thus made available.

By the novel process, high concentrations of exchanging groups are achieved on the silicon dioxide surface. The novel manufacturing process can be applied to nonporous silicon dioxide products, to silicon dioxide products which are porous throughout, as well as to porous silicon dioxide layers on a nonporous substrate By the use of silicon dioxide products having different average pore diameters, the exchange capacity, as well as the kinetics of the ion exchange process, can be varied and thus adapted to the specific separation problem.

In accordance with the above description, this invention relates, in its various aspects, to a. a process for the introduction of benzylhydroxysilyl groups onto the surface of silicon dioxide, preferably porous silicon dioxide, by reaction with benzyltrichlorosilane in the absence of air followed by the hydrolysis of the thus-introduced benzylchlorosilyl groups;

b. a process for the conversion of the thus-produced silicon dioxide having benzylhydroxysilyl groups on its surface (i) into cation exchange resins by introduction of sulfonic acid groups onto the benzylhydroxysilyl groups by reaction with a sulfonating group, e.g., chlorosulfonic acid, or (ii) into anion exchange resins by introduction of amino groups onto the benzylhydroxysilyl groups by reaction with chloromethyl methyl ether in the presence of a reaction catalyst followed by reaction of the thus-introduced chloromethyl groups with ammonia or a primary, secondary or tertiary amine;

c. novel benzylated silicon dioxides useful as intermediates for the production of ion exchange resins.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1 a. Approximately 50 g. of the two following silicon dioxide products are utilized as starting material:

| | Starting porous SiO$_2$ | |
| --- | --- | --- |
| | A | B |
| Specific surface area | 581 m$^2$/g. | 286 m$^2$/g. |
| Specific pore volume | 0.86 ml./g. | 0.80 ml./g. |
| Average pore diameter | 60 A. | 110 A. |

The starting silicon dioxide is predried for 48 hours at 150° C. and then annealed under a high vacuum (final pressure <1 . 10$^{-4}$ torr [mm. Hg]) for 24 hours at 400° C. After cooling, 50 ml. of liquid benzyltrichlorosilane is applied to the silicon dioxide under a high vacuum. Then, the reaction mixture is placed under an atmosphere of dry nitrogen and heated for 72 hours to 250°

C. Subsequently, the excess benzyltrichlorosilane is removed under a high vacuum, and the resulting product is annealed for 48 hours at 400° C.

The thus-produced silicon dioxide bearing benzylchlorosilyl groups on the surface thereof is thereafter suspended in 500 ml. of water and washed until free of chloride with water. Thereupon, the product is dried for 24 hours at 120° C.

b. 50 g. of the thus-obtained benzylated silicon dioxide having benzylchlorosilyl groups on its surface is suspended in a 500 ml. flask containing 300 ml. of carbon tetrachloride. Subsequently, 420 ml. of an emulsion of chlorosulfonic acid in carbon tetrachloride (volume ratio 1 : 2) is introduced in incremental portions with vigorous agitation. The reaction mixture is heated for 5 hours under reflux and then poured onto 500 g. of ice. The thus-produced sulfonated silicon dioxide is filtered off, washed free of sulfate with distilled water, and dried for 24 hours at 120° C.

Table I below indicates the concentration of benzyl groups (after the benzylation), as well as of sulfonic acid groups (after the sulfonation). Both values were determined from the carbon and sulfur contents, respectively, of the thus-obtained products and are based on unit area ($m^2$).

TABLE I

|  | A | B |
|---|---|---|
| Carbon content after reaction with benzyltrichlorosilane (%) | 12.0 | 7.9 |
| Surface concentration of benzylhydroxy groups ($\mu$mol/$m^2$) | 4.5 | 4.5 |
| Carbon content after sulfonation of benzylated products (%) | 9.5 | 6.7 |
| Surface concentration of remaining benzylhydroxy groups ($\mu$mol/$m^2$) | 4.3 | 4.4 |
| Sulfur content after sulfonation (%) | 3.9 | 2.6 |
| Surface concentration of sulfonic acid groups ($\mu$mol/$m^2$) | 4.3 | 4.5 |

EXAMPLE 2 a. 30 g. of the benzylated silicon dioxide (preparation B) produced in accordance with Example 1(a) is suspended in 100 ml. of dichloromethane. Then, 12.3 g. of zinc chloride and 80 ml. of chloromethyl methyl ether are added thereto. The reaction mixture is heated under reflux for 24 hours with agitation (at about 50° C.). After cooling, 200 ml. of methanol is added thereto. The chloromethylated silicon dioxide is filtered, washed with methanol and dioxane and dried at 100° C.

The surface concentration of chloromethyl groups is 4.0 $\mu$mol/$m^2$.

(b) 2.5 g. of the chloromethylated silicon dioxide obtained in accordance with Example 2(a) is mixed respectively with 80 ml. of a 50% strength solution of one of the following amines in dioxane:

( $\alpha$ ) Trimethylamine
( $\beta$ ) Triethylamine
( $\gamma$ ) Dimethylaminoethanol The suspension is allowed to stand at 0° C. with occasional shaking for several days. Thereafter, the reaction mixture is filtered, washed with dioxane, and dried at 100° C.

The properties of the thus-obtained products can be seen from Table II.

TABLE II

| Exchanging Group | Surface Concentration of Amine Groups ($\mu$mol/$m^2$) | Exchange Capacity meq./g. |
|---|---|---|
| ($\alpha$) $-CH_2-\langle\phantom{x}\rangle-CH_2\;\overset{\oplus}{N}-(CH_3)_3$ | 3.28 | 0.75 |
| ($\beta$) $-CH_2-\langle\phantom{x}\rangle-CH_2\;\overset{\oplus}{N}-(C_2H_5)_3$ | 2.60 | 0.60 |
| ($\gamma$) $-CH_2-\langle\phantom{x}\rangle-CH_2\;\overset{\oplus}{N}{\diagup (CH_3)_2 \atop \diagdown CH_2CH_2OH}$ | 3.60 | 0.75 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the introduction of benzyl groups onto the surface of silicon dioxide by reacting silicon dioxide with benzyltrichlorosilane followed by hydrolysis of the thus-introduced benzylchlorosilyl groups to benzylhydroxysilyl groups, the improvement which comprises conducting the reaction of the silicon dioxide with benzyltrichlorosilane at about 200°–300° C. in the absence of solvent, air and moisture.

2. A process according to claim 1, wherein the reaction with benzyltrichlorosilane is conducted in nitrogen.

3. A process according to claim 1, wherein the silicon dioxide is annealed after reaction with the benzyltrichlorosilane and prior to the hydrolysis, under reduced pressure at a temperature of up to 400° C.

4. A process according to claim 1, wherein the starting silicon dioxide, prior to the reaction with the benzyltrichlorosilane, is annealed under reduced pressure at a temperature up to about 500° C.

5. A process according to claim 1, wherein the reaction with benzyltrichlorosilane is conducted for about 24-100 hours; wherein the silicon dioxide is annealed after reaction with the benzyltrichlorosilane and prior to the hydrolysis, under reduced pressure at a temperature of up to 400° C.; and wherein the starting silicon dioxide, prior to the reaction with the benzyltrichlorosilane, is annealed under reduced pressure at a temperature up to about 500° C.

6. A process according to claim 1, wherein the silicon dioxide is porous.

7. A process according to claim 6, wherein the silicon dioxide has an average pore diameter greater than 30 A.

8. A process according to claim 5 wherein the silicon dioxide is porous with an average pore diameter greater than 30 A.

9. Silicon dioxide having on the surface thereof benzylhydroxysilyl groups at a concentration of 3 to 4.5 $\mu$mol./m$^2$.

10. A porous silicon dioxide according to claim 9.

11. A porous silicon dioxide according to claim 10, wherein the pores are greater than 30 A.

* * * * *